United States Patent [19]

Mani et al.

[11] 4,389,293

[45] Jun. 21, 1983

[54] PROCESS FOR THE RECOVERY OF ANHYDROUS HYDROGEN FLUORIDE FROM AQUEOUS SOLUTIONS OF FLUOSILICIC ACID AND HYDROGEN FLUORIDE

[75] Inventors: Krishnamurthy N. Mani, Denville; Frederick P. Chlanda, Rockaway, both of N.J.

[73] Assignee: Allied Corporation, Morris Township, Morris County, N.J.

[21] Appl. No.: 336,734

[22] Filed: Jan. 4, 1982

[51] Int. Cl.$^3$ ............................................. B01D 57/02
[52] U.S. Cl. ........................... 204/180 P; 204/180 B
[58] Field of Search ...................... 204/180 P, 180 B

[56] References Cited

U.S. PATENT DOCUMENTS

| | | | |
|---|---|---|---|
| 3,450,609 | 6/1969 | Carlin | 204/180 P |
| 3,787,304 | 1/1974 | Chlanda et al. | 204/180 P |
| 3,933,605 | 1/1976 | Butler et al. | 204/180 P |

Primary Examiner—Arthur P. Demers
Attorney, Agent, or Firm—Thomas D. Hoffman; Gerhard H. Fuchs; Richard C. Stewart, II

[57] ABSTRACT

An electrodialytic distillative process for recovery of anhydrous hydrogen fluoride from an aqueous solution of fluosilicic acid and hydrogen fluoride wherein the concentration of hydrogen fluoride in said solution is such that hydrogen fluoride cannot be recovered therefrom by distillation, which comprises subjecting the solution to electrodialysis thereby increasing the total acids concentration in said solution to equal to or greater than about 46 weight percent, and thereafter recovering anhydrous hydrogen fluoride by distillation.

15 Claims, 3 Drawing Figures

PROCESS FOR THE RECOVERY OF ANHYDROUS HYDROGEN FLUORIDE FROM AQUEOUS SOLUTIONS OF FLUOSILICIC ACID AND HYDROGEN FLUORIDE

DESCRIPTION

BACKGROUND OF THE INVENTION

1. Field of the Invention

This invention relates to a process for producing anhydrous hydrogen fluoride and finely divided silica from waste fluosilicic acid solutions.

2. Brief Description of the Prior Art

In the industrial manufacture of phosphoric acid, phosphate rock is treated with sulfuric acid. This process results in the formation of by-product aqueous fluosilicic acid which is produced in large quantities and is normally discarded. Because of the attendant pollution problems associated with discarding this waste product and the potential value of the waste product as a source of silica and hydrogen fluoride, an economical and efficient process is highly desired for recovery of these important and useful industrial materials from by-product fluosilicic acid. For example, finely divided silica has been historically used as a white pigment in paints for decorating and protecting the surfaces of a wide variety of articles and products such as automobiles, household interiors and household exteriors. Also, hydrogen fluoride is widely used in applications such as polishing, etching and frosting of glass; for pickling copper, brass, stainless and other alloy steels; electropolishing of metals; manufacture of fluorocarbons; manufacture of cryolite; cleaning stone and brick; purification of filter paper and graphite; dissolving ores and cleaning castings; and the like.

Several electrodialytic procedures have been proposed for recovery of fluorine based acids such as hydrofluoric acid and fluosilicic acid. For example, a process is described in Russian Pat. USSR No. 174,610 (1965) involving an electrodialysis method of concentrating substances, including fluosilicic acid, wherein sulfuric acid is utilized in the anolyte. However, the reference does not indicate whether this procedure is applicable to recovery of anhydrous hydrofluoric acid.

A process for recovery of hydrofluoric acid is described in U.S. At. Energy Comm. ORNL-2308, 14 pp. (1956) in which a by-product aqueous solution of hydrofluoric acid from the hydrofluorination of uranyl dioxide is subjected to electrodialysis followed by distillation to recover hydrofluoric acid. However, this process is not described as useful for recovery of anhydrous HF from an aqueous solution of HF and fluosilicic acid, and the authors believe that the process is not economical for commercial use.

In the process described in U.S. Pat. No. 4,144,158 (Chlanda, Nagasubramanian). Aqueous fluosilicic acid is pyrolyzed to form finely divided silica, a dilute aqueous solution of hydrogen fluoride and fluosilicic acid which is subjected to electrodialysis. Anhydrous hydrogen fluoride is recovered by distillation. While relatively effective as a method for recovering anhydrous hydrogen fluoride, this process suffers from some disadvantages. For example, because of restraints on the concentration of fluosilicic acid, i.e., less than 5%, in the dilute aqueous solution of fluosilicic acid and hydrogen fluoride, the process is restricted to use with pyrolyzation procedures which provide high conversions of fluosilicic acid to hydrogen fluoride and silica. This results in reduced process flexibility and a reduction in the capability of the process to provide differing grades of silica. Furthermore, this disadvantage can also result in high energy expenditures. Another disadvantage of this process is that the concentration of hydrogen fluoride in the electrodialytic output from concentrate cell of the electrodialytic unit must be greater than about 38%. If hydrogen fluoride concentrations are lower than this threshold amount, anhydrous hydrogen fluoride cannot be recovered by distillation and corrosive dehydrating material such as concentrated sulfuric acid must employed.

SUMMARY OF THE INVENTION

In accordance with this invention there is provided an improved process for recovering anhydrous hydrogen fluoride from a solution comprising hydrogen fluoride, fluosilicic acid and water, wherein the percentage composition of said solution is such that anhydrous hydrogen fluoride cannot be recovered therefrom by distillation, said process comprising the steps of:

(a) introducing said solution into a dilute compartment of at least one unit cell of an electrodialysis assembly comprising one or more unit cells, positioned between an anolyte compartment containing an anode immersed in an anolyte, a catholyte compartment containing a cathode immersed in a catholyte, each of said unit cells comprising a concentrate compartment and a dilute compartment separated by an anion permeable membrane, and each bounded by a face of a cation permeable membrane;

(b) introducing into said concentrate compartment of said cell an aqueous solution of hydrogen fluoride and fluosilicic acid wherein the concentration of fluosilicic acid in said solution is greater than about 5 weight percent, and wherein the total concentration of hydrogen fluoride and fluosilicic acid in said solution is such that hydrogen fluoride cannot be obtained therefrom by distillation;

(c) passing direct current through said electrodialysis assembly to increase the concentration of hydrogen fluoride in said concentrate compartment forming a concentrated solution in which the total concentration of hydrogen fluoride and fluosilicic acid in said concentrated solution is such that anhydrous hydrogen fluoride can be recovered therefrom by distillation;

(d) withdrawing said concentrated solution from said concentrate compartment; and (e) recovering anhydrous hydrogen fluoride from said solution of step (d) by distillation.

A more specific embodiment of the above process of this invention further comprises the steps of:

distilling water from the dilute aqueous solution prior to passing direct current through said electrodialysis assembly;

drawing off a heavier fluosilicic acid enriched bottom portion therefrom; and introducing said bottom portion into said concentrate compartment of said unit cell.

The process of this invention is especially adapted for use in processes for converting aqueous solutio of fluosilicic acid to anhydrous hydrogen fluoride and finely divided silica. Such an adaptation comprises the steps of:

pyrolyzing aqueous fluosilicic acid forming a mixture of finely divided silica and gaseous hydrogen fluoride, water and silicon tetrafluoride;

separating silica from said mixture;

forming an aqueous solution of fluosilicic acid and hydrogen fluoride from the remaining components of said mixture; and subjecting said solution to the process of this invention as described herein above.

DESCRIPTION OF THE INVENTION

Figure 1:
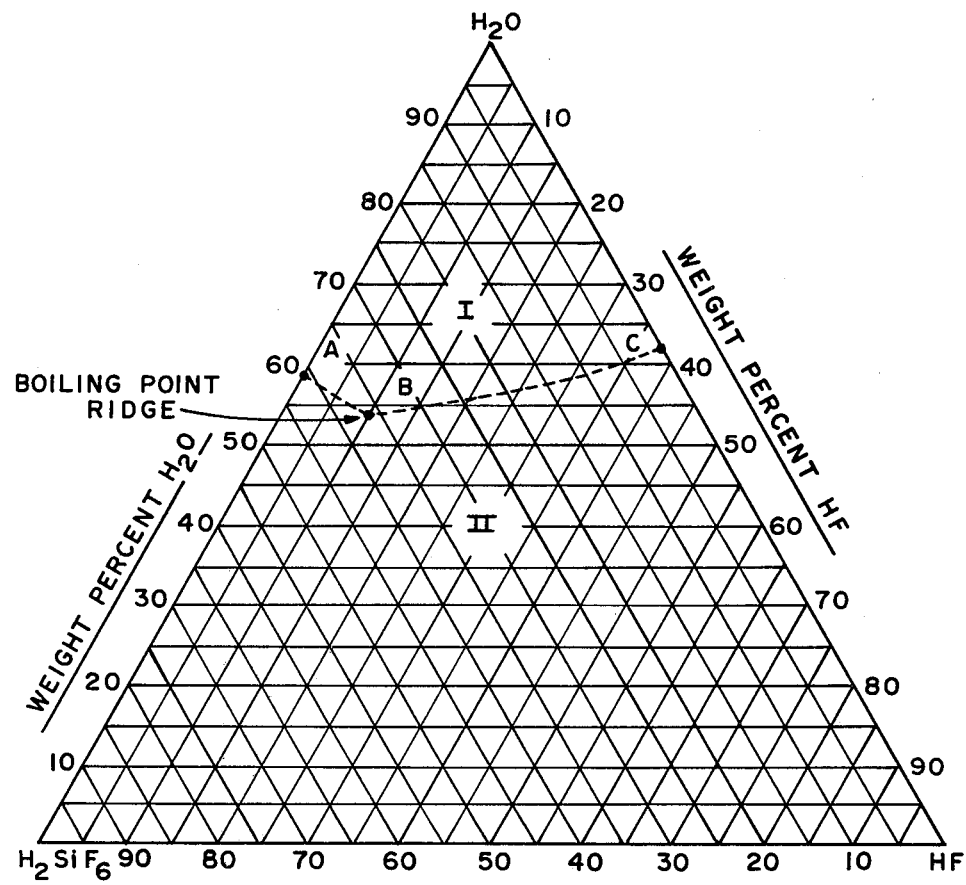
FIG. 1 is a diagram of the ternary liquid system of $HF/H_2SiF_6/H_2O$ described in the article by Munter et al. in Industrial and Engineering Chemistry, Vol. 39, No. 3 pages 427-431 (March 1947), illustrating the "boiling point ridge" separating regions I and II. This ridge represents the boundary over which the liquid composition in one region cannot be distilled at normal pressure to yield a condensate having a percent composition lying in the other region.

In FIG. 1 is illustrated the ternary phase diagram of the liquid system of hydrogen fluoride (HF)/fluosilicic acid ($H_2SiF_6$)/$H_2O$. As illustrated in the Figure, regions I and II represent the regions from which a liquid cannot be distilled to provide a liquid whose percent composition is defined by a point lying in the other region. In the figure, the dotted line represents the boiling point ridge separating these two regions and point A represents the binary azeotrope of $H_2SiF_6/H_2O$, of about 41/59 weight percent respectively, having a boiling point about 111.5° C. at one atmosphere; point B represents the ternary azeotrope of $HF/H_2SiF_6/H_2O$, of about 10/36/54 weight percent respectively, having a boiling point about 116.1° C. at one atmosphere; and point C represents the binary azeotrope of $HF/H_2O$, of about 38/62 weight percent respectively, having a boiling point of about 112° C. at one atmosphere.

Referring to FIG. 1, it will be seen that anhydrous hydrogen fluoride cannot be recovered from liquid systems falling within region I by distillation procedures. The disclosure of U.S. Pat. No. 4,144,158 teaches that the HF concentration in the ternary liquid solution must be increased to a value in region II, i.e. conentration of HF must be increased to about 38% or greater, before anhydrous hydrogen fluoride can be recovered from the solution by distillation. More specifically, in the process of that patent, an aqueous solution of fluosilicic acid is pyrolyzed to a dilute solution containing up to about 5 weight percent fluosilicic acid, with the remainder of the solution being water and hydrogen fluoride. The resulting dilute solution usually lies in region I of FIG. 2, and cannot be directly distilled to yield anhydrous hydrogen fluoride. In that process, the solution is subjected to electrodialysis so that the hydrogen fluoride content of the concentrate solution is increased to greater than 38 weight percent (based on the total weight of the concentrated solution) so that anhydrous HF can be recovered by distillation. In this prior art process, the feed to the concentrate compartments of the electrodialytic cell is contemplated to be a solution identical to the feed to the dilute compartments of the cell and to contain not more than 5% fluosilicic acid. Additionally, this prior art process contemplates that the feed to the concentrate compartments would consist only of recycled concentrate. Furthermore, U.S. Pat. No. 4,144,158 states that a hydrogen fluoride concentration of greater than about 38 weight percent is required in the product of the concentrate compartments.

We have found, surprisingly, that the introduction into the concentrate compartments of the electrodialysis unit of a stream of high $H_2SiF_6$ content and low HF content has a beneficial effect on the efficiency of the concentration process and on the amount of HF which can be recovered from the concentrate product. Furthermore, this beneficial effect results in the ability to use a wider range of membranes and current densities and still efficiently recover anhydrous HF from the concentrate product by distillation.

Figure 2:
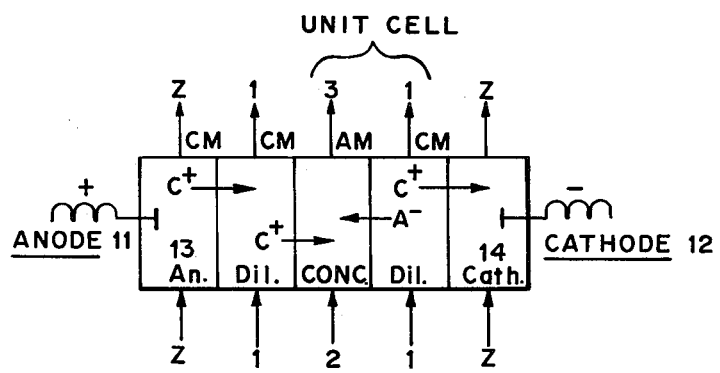
FIG. 2 is a schematic diagram of a typical electrodialysis unit representative of those useful in the practice of this invention.

The improved process of this invention and the advantages attendant thereto can be better understood by reference to FIG. 2. The unit cell of the assembly comprises a dilute and a concentrate compartment, separated by an anion-permeable membrane, and bounded by cation-permeable membranes. For convenience, the assembly shown in FIG. 2 contains only one basic Dil:Conc cell unit. However in practice the assembly may contain up to several hundred Dil:Conc units, the number of which may vary depending on the desired system capacity. In FIG. 2, the symbols An, Dil, Conc, Cath are used to designated respectively, Anolyte, Dilute, Concentrate, Catholyte compartments, each of which contains the designated liquid compositions. The symbols "AM" and "CM" represent anion permselective membranes and cation permselective membranes, respectively, and are the membranes which separate the compartments and which allow selective ion migration under an applied current. The symbol "M" represents a conductive membrane which can be either a cation- or anion-permeable membrane. Usually, cation-permeable membranes are utilized in bounding the cathode and anode compartments. The symbols "C+" and "A−" represent charged cation and anion species, respectively. The symbol "Z" represents liquid used as both anolyte and catholyte. Number 1 represents a dilute solution of $HF/H_2SiF_6/H_2O$ which is fed to the Dil compartments or any other dilute compartments of a multicell stack. Solution number 1 can be recycled to combine with more dilute solution following electrodialysis, and the combined dilute solutions thereafter subjected to further electrodialysis as will be described in detail hereinbelow. The concentration of HF in solution number 1 is preferably greater than about 5 weight percent, and more preferably in the range of from about 5 to about 36 weight percent. Number 2 represents a solution of $HF/H_2SiF_6/H_2O$, which is fed into the concentrate compartments of the electrodialysis cell (or any other concentrate compartments of a multicell stack) and in which the concentration of hydrogen fluoride (HF) is preferably less than that in solution number 1, and the concentration of $H_2SiF_6$ is preferably greater than that in solution number 1. Solution number 3 represents a concentrated solution of $HF/H_2SiF_6/H_2O$ having a HF concentration greater than that in solution number 2, and preferably less than or equal to 38 weight percent. The combined weight of HF and $H_2SiF_6$ in solution number 3 is such that anhydrous HF can be recovered therefrom by distillation.

As is apparent from FIG. 2, the conduct of the process of this invention is illustrated through use of an electrodialysis assembly having a pluralility of cation permselective and anion permselective membranes positioned between an anode 11 and a cathode 12. As used herein, "electrodialysis assembly", is a form of dialysis cell in which electric current aids in the separation of substances that ionize in solution. The electrodialysis assembly as shown in FIG. 2, comprises five compartments, separated by membranes. From left to right, the assembly includes an anolyte compartment (An); cation exchange membrane (Cm); dilute compartment (Dil); a cation exchange membrane (Cm); a concentrate compartment (Conc); an anion exchange membrane (Am); a dilute compartment (Dil); a cation exchange membrane (Cm); and a catholyte compartment 14. The anolyte compartment cations an anode 11 usually platinum or other inert metal electrode immersed in an anolyte (An) such as a solution of 5 weight percent sulfuric acid. Dilute compartments initially contain the solution number 1, and the concentrate compartment (conc) contains solution number 2. The catholyte compartment 14 contains a cathode 12, usually platinum or other electrolytically inert electrode, immersed in a catholyte (cath) such as a solution of 5 weight percent sulfuric acid. Usually, the anolyte and catholyte are the same solution. Cathode 12 and anode 11 are connected to a suitable direct current source.

The types of cation permselective membranes (Cm) employed in the conduct of the process of this invention are not critical and conventional membranes known to those of skill in the art can be used. However, the specific membrane chosen should preferably be substantially impermeable to anions and have adequate mechanical strength so that it will not break. Illustrative of cation permselective membranes which are useful in the conduct of the process of this invention are those having strongly acidic groups, such as sulfonic acid groups chemically bonded to a polymeric matrix. Such cation permselective membranes are well known in the art see for example U.S. Pat. Nos. 3,882,093; 3,909,378; 4,225,240; and 3,925,332 and, accordingly, will not be described herein in detail.

The type of anion permselective membranes employed in the conduct of the process of this invention is also not critical and conventional membranes can be used. However the specific membrane chosen for use should be preferably highly permeable to univalent anions, have a low or no permeability for cations and have sufficient mechanical strength to withstand the rigors of cell operation. Such anion permselective membranes are well known in the art (see for example U.S. Pat. Nos. 3,133,889; and 3,257,334) and, accordingly, and will not be described herein in detail.

The operation of the electrodialysis assembly is essentially as follows: A dilute solution 1 of $HF/H_2SiF_6/H_2O$, whose percent composition is defined by a point lying in Region I of FIG. 1, is fed into Dilute compartments. In the preferred embodiments of this invention, the weight percent of HF is in the range of from about 5 to about 36 weight percent (wherein all weight percents are based on the total weight of the composition) and HF cannot be recovered therefrom by distillation. In the particularly preferred embodiments of this invention, the weight percent of HF contained in said solution 1 will vary in the range of from about 5 to about 30 weight percent, and the concentrations of $H_2SiF_6$ and $H_2O$ are such that anhydrous hydrogen fluoride cannot be recovered from solution 1 by distillation.

A solution 2, containing HF, $H_2SiF_6$ and $H_2O$, is fed into the concentrate compartment. The concentration of HF in solution 2 is preferably less than the concentration of HF in solution 1. The concentration of HF in solution 2 is also less than the concentration of $H_2SiF_6$ in solution 2. The total acid concentrations, i.e. total amounts of HF and $H_2SiF_6$, is selected such that anhydrous HF cannot be recovered from solution 2 by distillation. In the preferred embodiments of this invention, the concentration of HF in solution number 2 is in the range of from about 10 to about 30 weight percent, the concentration of $H_2SiF_6$ is in the range of from about 10 to about 36 weight percent, and the total acid concentration is not greater than about 46 weight percent. In the particularly preferred embodiments of this invention the concentration of HF in solution number 2 is in the range of from about 10 to about 15 weight percent, the concentration of $H_2SiF_6$ is in the range of from about 30 to about 36 weight percent and the total acids concentration is not greater than about 46 weight percent. All weight percent as set forth hereinabove are based on the total weight of solution 2. Amongst these particularly preferred embodiments, the most preferred embodiment is that in which solution number 2 is the ternary azeotrope of $HF/H_2SiF_6/H_2O$ of about 10/36/54 weight percents respectively.

A direct current is passed from anode 11 to cathode 12. When direct current is applied to the cell assembly, anions in the Dilute compartments will migrate through the anion permeable membrane into the adjacent concentrate compartment; hydrogen ions will migrate through the cation permeable membrane from the anolyte compartment to the one of Dilute compartments; from that Dilute compartment into the concentrate compartment; and from the other Dilute compartment into the catholyte compartment 14. The current in the assembly is transported by the migrating cations and anions. The overall result is that the concentrate compartment will contain a higher concentration of HF than the original solution number 2, and Dil compartments will be significantly depleted in HF concentration.

As is seen from FIG. 2, the electrodialysis assembly is designed so that fluoride ion and hydrogen ion are allowed to migrate into the concentrate compartment under the influence of an applied electric potential, and both ions are constrained from migrating out of the concentrate compartment by virtue of the ion-selective membranes and the applied potential; thus resulting in a steadily increasing concentration of hydrogen fluoride in the concentrate compartment. The electrodialytic procedure is continued for a time sufficient for the total acids concentration in solution 2 of the concentrate compartment to increase until anhydrous hydrogen fluoride can be recovered from solution 2 by distillation. In general, this occurs when the percent composition of the concentrated solution is defined by a point lying within region II of the phase diagram of FIG. 1. In the preferred embodiments of this invention the percent of $H_2O$ in the concentrated solution is not greater than about 54 weight percent; the total acid concentration is not less than about 46 weight percent, and the concentration of HF is in the range of from about 10 to about 36 weight percent at the end of the electrodialysis step.

After dialysis is complete, the contents of each concentration compartment in the electrodialysis assembly are drawn off as solution number 3 by conventional means, such as an overflow valve or piping system and are subsequently combined. The combined solution is then subjected to distillation to recover anhydrous hydrogen fluoride. The bottoms preferably containing an azeotropic mixture of $HF/H_2SiF_6/H_2O$ is drawn off, and fed into the concentrate compartment of the assembly as solution 2 for use in the electrodialytic step 1.

Figure 3:
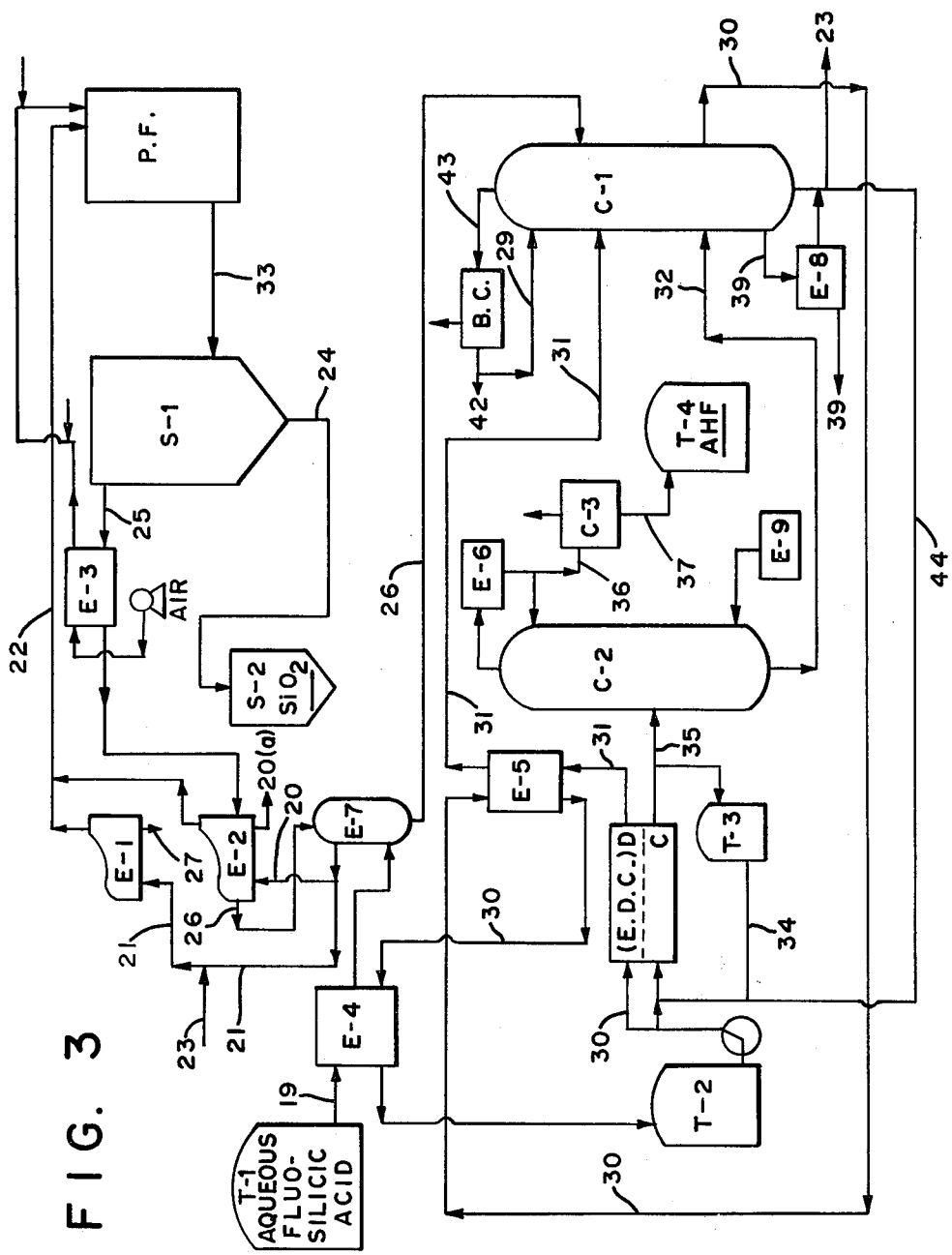
FIG. 3 is a flow diagram illustrative of the adaptation of the process of this invention in which aqueous fluosilicic acid is converted by pyrolysis to finely divided silica and a dilute aqueous solution of fluosilicic acid and hydrogen fluoride, and in which anhydrous hydrogen fluoride is recovered therefrom in accordance with the electrodialysis and distillation process of this invention.

The improved process of this invention is especially useful for recovery of anhydrous hydrogen fluoride in processes in which aqueous fluosilicic acid is pyrolyzed to form finely divided silica and a dilute ternary liquid system of $HF/H_2SiF_6/H_2O$. Such use may be better understood by reference to FIG. 3 of the drawings.

Aqueous fluosilicic acid is fed from storage tank T-1 as stream 19 to evaporators E-4 and E-7 which successively heat the material prior to pyrolysis. After exiting from E-7, a part of the stream, as stream 20, is fed into evaporator E-2 and the remainder as stream 21, is combined with recycle stream 23 and fed to evaporator E-1 which further raises the temperature of the stream. Stream 27 containing small amounts of phosphoric acid is drawn off from evaporator E-1. The exiting stream is subsequently combined with stream 20, having passed through evaporator E-2, to form stream 22. Stream 20(a) containing small amounts of phosphoric acid is drawn off from evaporator E-2. Stream 22 is fed to the pyrolysis furnace, P.F., where pyrolysis of aqueous fluosilicic acid to form silica and gaseous HF is accomplished at a temperature of about 900° to 1000° C. The exit stream 33, from P.F., is passed into S-1, a silica separator, in which the coagulated silica particles are fed out of the bottom as stream 24 to S-2, a silica storage tank.

The prior art process steps of pyrolyzing aqueous fluosilicic acid and separating the silica formed from the dilute aqueous solution of $HF/H_2SiF_6/H_2O$ including process variables, such as pyrolysis temperatures employed, specification of the apparatus used to separate the finely divided silica formed, are wellknown in the prior art, as described, for example, in the above-identified patent of Reed, supra, and are not discussed herein in detail.

Exit stream 25 from S-1 is passed through evaporator E-3 for cooling and then to evaporator E-2 where it exits as stream 26 and subsequently passes through evaporator E-7 and is then sent to distillation column C-1. The distillation column C-1 as shown can be eliminated and the aqueous stream 26 sent directly to the dilute compartments of the electrodialysis assembly as stream 44 as described above. A portion of the water in the column C-1 contents is distilled off as stream 43 into condenser BC and byproduct gases are fed out of BC as stream 42 and water condensate as stream 29. A heavy fluosilicic acic enriched bottom solution, containing from about 10 to about 36 weight percent $H_2SiF_6$, is drawn off from C-1 as stream 44 and fed into the concentrate compartment of the electrodialysis unit (EDC). The dilute aqueous solution of $HF/H_2SiF_6/H_2O$ as stream 30, containing from about 5 to about 36 weight percent HF and from about 5 to about 36 weight percent $H_2SiF_6$ with the total acid concentration being under 66 weight percent, is fed through evaporators E-5 and E-4 to cool and then to holding tank T-2 from where it is fed into the electrodialysis unit, EDC, containing a plurality of unit cells as illustrated in FIG. 2.

The combined concentrate compartments are designated C and the combined dilute compartments are designated as compartment D. After electrodialysis, the concentrated stream from the concentrate compartments having a percent composition which lies within region II of the phase diagram of FIG. 1, a HF content of less than 38 weight percent, and a total HF and $H_2SiF_6$ content of at least about 46 weight percent is passed as stream 35 to distilling column C-2, where HF is distilled off and condenses in evaporator E-6 and, as stream 36, passes through purification tower C-3. Small amounts of water and $SiF_4$ are drawn off as stream 38 from tower C-3. Purified anhydrous HF as stream 37 is fed into storage tank T-4. Optionally, a portion of stream 35 is drawn off and is recycled to tank T-3 and then back into the EDC unit as stream 34 for further concentration. The dilute stream from the dilute compartments of the EDC unit, is fed as stream 31 through evaporator E-5 and recycled back to the distilling column C-1. The remainder of the concentrated solution from the distilling column C-2, after HF distillation, is fed as stream 32 back to distilling column C-1 to combine with streams 26 and 31. Stream 23 is drawn off the bottom of C-1 containing small amounts of phosphoric acid and thereafter to evaporator E-1.

In one variation of the process of this invention, the process can be controlled to increase the amount of the finely divided silica product. In this variation, ordinary silica is fed into a reaction prior to the pyrolysis furnace P.F., where it reacts with all or a part of the hydrogen fluoride to produce silicon tetra fluoride in accordance with the following reaction scheme:

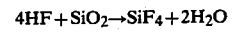

$$4HF + SiO_2 \rightarrow SiF_4 + 2H_2O$$

The mixture is subjected to further pyrolysis to form finely divided silica and gaseous hydrogen fluoride, water and silicon tetrafluoride. The finely divided silica is separated from the mixture, and the gaseous mixture of hydrogen fluoride, water and silicon tetrafluoride is cooled and the resulting aqueous solution is subjected to the process steps described above to provide anhydrous hydrogen fluoride.

The invention will be further illustrated by reference to the following specific examples, the details of which should not be construed as limitations on the scope or the spirit of the invention.

COMPARATIVE EXAMPLES I–XXI

An electrodialysis cell of the type illustrated in FIG. 2 was employed in a series of experiments which are representative of the invention, and/or which illustrate the advantages attendant thereto by comparison with the prior art.

Polyfluorocarbon cylinders (equipped with solution inlets and outlets) were placed between membranes which were of about 11 cm² exposed surface area. The membrane and cell arrangement that was used is as follows: platinum anode; cation exchange membran; anion exchange membrane; cation exchange membrane; and platinum cathode, forming five compartments which were (from the anode side): anolyte, dilute$_1$, concentrate, dilute$_2$, catholyte. The anolyte and catholyte were both fed from a reservoir of 5 weight percent sulfuric acid. The dilute compartments were fed from a separate reservoir containing a dilute aqueous solution of $H_2SiF_6$ and HF. The concentrate compartment contained a solution of HF and $H_2SiF_6$.

Employing various modifications of the above-identified electrodialysis cell, the dilute and concentrate compartments were charged with aqueous solutions having varying concentrations of HF, and $H_2SiF_6$ in accordance with the process of U.S. Pat. No. 4,744,158. A direct current was passed through the cell, and samples from the concentrate and dilute compartments were collected and analyzed to determine the concentrations of HF and $H_2SiF_6$ in the dilute and concentrate compartments at the end of electrodialysis. The samples were collected by overflow from the cell through a 15 mm×1 mm i.d. tube. As the current passed, a steady flow of solution were collected from the overflow in tared cups, replaced at known intervals. The cups were weighed, and the weight percent of HF and $H_2SiF_6$ were obtained by titration. In this titration procedure, each sample was diluted with 20 ml of $H_2O$ and 10 ml of saturaged $KNO_3$, and cooled in an ice bath. The cooled solution was titrated with standard 2 N NaOH until the phenolphthalein end point appeared and remained for 5 to 10 seconds. The solution was then warmed in an 80° water bath and titrated with 2 N NaOH until the appearance of a permanent phenolphthalein end point. The weight percent of HF and weight percent of $H_2SiF_6$ in the sample were calculated from the titration data through use of conventional techniques well known to those of skill in the art. The results of these experiments are set forth in the following TABLE I.

TABLE 1

| Comp. Ex. No. | Membranes (A/C) | Current Density (mA/cm²) | Dilute % HF | Dilute % H₂SiF₆ | Concentrate % HF | Concentrate % H₂SiF₆ | Current Efficiency For HF | Current Efficiency For H₂SiF₆ |
|---|---|---|---|---|---|---|---|---|
| I | ASV[1]/C322[2] | 273 | 9.5 | 0 | 39.3 | 0 | 1.51 | — |
| II | ASV/C322 | 273 | 30.0 | 0 | 48.1 | 0 | 1.44 | — |
| III | ASV/C322 | 273 | 28.0 | 3.8 | 47.0 | 2.3 | 1.33 | .01 |
| IV | ASV/C322 | 273 | 29.0 | 7.4 | 46.6 | 3.8 | 1.32 | .01 |
| V | ASV/C322 | 273 | 28.2 | 10.2 | 47.9 | 3.8 | 1.28 | .01 |
| VI | ASV/C322 | 273 | 20.5 | 10.9 | 41.8 | 5.9 | 1.21 | .02 |
| VII | ASV/C322 | 273 | 19.5 | 14.1 | 42.0 | 6.7 | 1.13 | .03 |
| VIII | ASV/C322 | 273 | 21.7 | 14.8 | 43.2 | 6.6 | 1.19 | .03 |
| IX | ASV/C322 | 182 | 28.0 | 3.8 | 44.0 | 2.1 | 1.13 | .01 |
| X | ASV/C66ST[3] | 273 | 26.5 | 0 | 37 | 0 | 1.99 | — |
| XI | ASV/MC3470[4] | 273 | 18.3 | 0 | 36.5 | 0 | 1.69 | — |
| XII | ASV/MC3470 | 273 | 23.2 | 8.3 | 39.6 | 2.5 | 1.77 | .02 |
| XIII | ASV/MC3470 | 273 | 21.8 | 14.3 | 40.5 | 4.4 | 1.78 | .03 |
| XIV | ASV/CL25T[5] | 273 | 22.3 | 7.6 | 40.8 | 2.6 | 1.64 | .02 |
| XV | ASV/CL25T | 273 | 21.2 | 14.8 | 42.3 | 3.6 | 1.51 | .02 |
| XVI | ASV/CL25T | 273 | 23.6 | 18.2 | 43.4 | 5.4 | 1.40 | .02 |
| XVII | ASV/CL25T | 327 | 16.4 | 19.5 | 40.5 | 5.4 | 1.44 | .03 |
| XVIII | ASV/CL25T | 273 | 24.0 | 14.5 | 41.3 | 6.2 | 1.50 | .03 |
| XIX | ASV/49-8B[6] | 273 | 22.0 | 14.6 | 43.7 | 4.1 | 1.40 | .02 |
| XX | ASF[7]/CL25T | 273 | 22.0 | 15.8 | 29.3 | 13.9 | 0.81 | .05 |
| XXI | AVS[8]/CL25T | 273 | 13.9 | 33.6 | 9.6 | 9.6 | 1.00 | .04 |
| XXII | UZL[9]/CL25T | 273 | 24.8 | 13.5 | 28.4 | (20) | 0.96 | (.09) |

[1] "ASV" is an anion permeable membrane manufactured and sold by Asahi Glass Co. Ltd under the trade designation ASV.
[2] "C322" is a cation permeable membrane manufactured and sold by AMF, Inc, under the trade designation C322.
[3] "C66ST" is a strongly acidic cation permeable membrane having low electric resistance manufactured and sold by Tokuyama Soda, Co. Ltd. under the trade designation C66ST.
[4] "MC33470" is a cation exchange membrane manufactured and sold by Ionac, Inc. Watertown, Mass under the trade designation MC3470.
[5] "CL25T" is a strongly acidic cation permeable membrane manufactured and sold by Tokuyama Soda Co. Ltd. under the trade designation CL25T.
[6] "49-8B" is a cation permeable membrane which was prepared from a 10 mil film of ultrahigh molecular weight polyethylene by 2 stage styrenation (swelling by monomer followed by polymerization). The divinyl benzene content of the monomer was 15%. After styrenation, the film was reacted with $ClSO_3H$ in dichloromethane for 3.5 hr. and hydrolyzed.
[7] "AFS" is an anion permeable membrane manufactured and sold by Tokuyama Soda, Co. Ltd. under the trade designation AFS-4T.
[8] "AVS" is an anion permeable membrane manufactured and sold by Tokuyama Soda Co. Ltd. under the trade designation AVS-4T.
[9] "UZL" is an anion permeable membrane manufactured and sold by Ionics, Inc. under the trade designation 204-UZL-386.

EXAMPLES I TO XXII

Utilizing the electrodialytic cells of Comparative Examples I to XXII, a series of experiments were conducted to show the effect of increased $H_2SiF_6$ content in the concentrate compartment on the total acids/(HF and $H_2SiF_6$) concentration tranported. In these experiments, a $HF/H_2SiF_6/H_2O$ azeotrope was fed into the concentrate compartment of the cell. Several methods were employed to determine the total acids concentration transported.

In one (Type 1) a calibrated reservoir of about 100 mL was used. A sample was taken at the beginning of the interval and the volume read. At the end of the interval, the volume was read again and another sample was taken. The procedure was repeated several times so that a number of points over a concentration range were obtained. Type 2 experiments were variations of Type 1 experiments in which only 2 points were found.

A third method (Type 3) was used in which a feed of $HF/H_2SiF_6$ of known concentration was pumped into the concentrate compartment at a known rate and samples were collected by overflow from the cell in several tared cups which were replaced at intervals. The cups were weighed and the weight percent HF and weight percent $H_2SiF_6$ were determined by titration.

In the Type 4 experiments, the concentrate compartment had a volume of 18 mL and was not externally stirred. Samples of the dilute feed were also analyzed at several intervals during the course of the experiment.

The Type 5 procedure was a variation of the Type 4 procedure in which the concentrate was stirred externally by a pump inserted into the system which gave a volume of 36.3 mL during the electrodialysis step.

The results of these experiments are set forth in Tables II–IV hereinbelow.

TABLE II

| Concentration Experiments with ASV/CL25T at 273 mA/cm² | | | | |
|---|---|---|---|---|
| Ex. No. | Dilute Range | | Conc. Range | |
| | % HF | % H₂SiF₆ | % HF | % H₂SiF₆ |
| I | 24.8–19.5 | 14.1–15.5 | 11.0–21.8 | 32.3–23.9 |
| II | 25.3–20.5 | 14.5–15.7 | 11.2–21.5 | 34.6–26.0 |
| III | 25.3–19.7 | 14.6–15.9 | 18.6–28.7 | 20.3–15.3 |
| IV | 27.4 | 13.6 | 26.1 | 21.6 |
| V | 20.8 | 14.7 | 24.5 | 22.2 |

TABLE II-continued

Concentration Experiments with ASV/CL25T at 273 mA/cm$^2$

| | | | | |
|---|---|---|---|---|
| VI | 22.3–20.5 | 12.9–13.4 | 10.0–14.2 | 35.3–31.8 |
| VII | 24.8–23.0 | 14.1–14.5 | 8.4–13.4 | 32.3–29.3 |
| VIII | 25.1–22.1 | 14.7–15.2 | 19.0–32.1 | 26.6–16.1 |
| IX | 25.5–23.1 | 14.0–14.4 | 12.9–22.7 | 34.4–25.5 |

| Ex. No. | Conc. Trans. | | Current Eff. | | Expt. Type |
|---|---|---|---|---|---|
| | % HF | % H$_2$SiF$_6$ | HF | H$_2$SiF$_6$ | |
| I | 53.5 | −0.9 | 2.05 | −0.005 | 1 |
| II | 48.8 | 3.5 | 2.12 | 0.021 | 1 |
| III | 52.3 | 2.5 | 2.14 | 0.014 | 1 |
| IV | 56.3 | −6.1 | 2.13 | −0.032 | 2 |
| V | 48.5 | −1.7 | 1.87 | −0.009 | 2 |
| VI | 44.5 | 5.7 | 2.23 | 0.039 | 3 |
| VII | 52.2 | 5.8 | 2.49 | 0.038 | 3 |
| VIII | 47.2 | 4.7 | 1.90 | 0.026 | 4 |
| IX | 43.6 | 6.9 | 1.77 | 0.039 | 5 |

TABLE III

Concentration Experiments with ASV/CL25T at 182 mA/cm$^2$

| Ex. No. | Dilute Range | | Conc. Range | |
|---|---|---|---|---|
| | % HF | % H$_2$SiF$_6$ | % HF | % H$_2$Si$_6$ |
| X | 25.5–22.8 | 13.6–14.3 | 12.8–23.0 | 32.2–23.7 |
| XI | 25.8–23.4 | 14.0–14.0 | 17.9–27.2 | 20.4–15.9 |
| XII | 25.4–23.1 | 13.8–13.9 | 10.2–20.1 | 34.5–26.2 |
| XIII | 26.9–24.8 | 14.4–14.5 | 22.8–31.0 | 26.1–16.7 |
| XIV | 25.3–23.0 | 13.7–14.0 | 14.8–20.0 | 31.2–26.6 |
| XV | 20.9–18.9 | 13.2–13.4 | 14.1–18.4 | 31.5–26.7 |
| XVI | 27.5–26.5 | 13.9–14.0 | 15.1–19.4 | 32.7–29.2 |

| Ex. No. | Conc. Trans. | | Current Eff. | | Expt. Type |
|---|---|---|---|---|---|
| | % HF | % H$_2$SiF$_6$ | HF | H$_2$SiF$_6$ | |
| X | 45.4 | 4.0 | 1.88 | 0.023 | 5 |
| XI | 47.5 | 6.7 | 1.87 | 0.037 | 5 |
| XII | 44.3 | 5.6 | 1.83 | 0.032 | 5 |
| XIII | 40.9 | 8.2 | 1.63 | 0.045 | 4 |
| XIV | 41.4 | 7.9 | 1.74 | 0.046 | 5 |
| XV | 35.9 | 6.8 | 1.52 | 0.040 | 5 |
| XVI | 44.2 | 8.6 | 1.87 | 0.051 | 5 |

TABLE IV

Concentration Experiments with Miscellaneous Membrane Pairs at 182 mA/cm$^2$

| Ex. No. | Membranes (A/C) | Ave. Dilute | | Ave. Concentrate | |
|---|---|---|---|---|---|
| | | % HF | H$_2$SiF$_6$ | % HF | % H$_2$SiF$_6$ |
| XVII | ASV/C322 | 23.7 | 13.9 | 16.1 | 30.8 |
| XVIII | ASV/CMV | 23.8 | 14.1 | 19.0 | 25.1 |
| XIX | (11/15)[1]/CL25T | 24.3 | 15.0 | 31.5 | 18.0 |
| XX | (11/15)/CL25T | 25.9 | 14.5 | 39.4 | 10.4 |
| XXI | ASV/CZL[2] | 20.5 | 15.6 | 26.2 | 19.3 |
| XXII | ASV/CZL | 21.9 | 15.7 | 24.2 | 21.6 |

| Ex. No. | Conc. Trans. | | Current Eff. | | Expt. Type |
|---|---|---|---|---|---|
| | % HF | % H$_2$SiF$_6$ | HF | H$_2$SiF$_6$ | |
| XVII | 46.4 | 1.6 | 1.73 | 0.008 | 5 |
| XVIII | 42.1 | 7.3 | 1.76 | 0.042 | 5 |
| XIX | 47.5 | 4.7 | 2.38 | 0.033 | 4 |
| XX | 50.7 | 2.1 | 2.27 | 0.013 | 4 |
| XXI | 37.5 | 7.2 | 2.16 | 0.057 | 4 |
| XXII | 34.3 | 11.5 | 1.93 | 0.089 | 4 |

[1] "(11/15)" is an anion permeable membrane prepared as follows: A solution of 5.6 g of a copolymer of styrene and vinylbenzyl chloride containing 82 wt % styrene in 32 g of N,N—dimethylformamide was prepared. 11.6 g of this solution was mixed with 0.35 g of N,N,N',N'—tetramethylhexamethylene diamine and cast on a glass plate with a doctor blade set at 0.9 mm. The plate stood at room temperature for 7 min. then was heated for 20 min. at 125° in a forced draft oven. The membrane was soaked free from the plate in dilute HCL, then treated with dilute HC at 60° for 1 hour.

[2] "CZL" is a cation permeable membrane manufactured and sold by Ionics, Inc. under the trade designation 61CZL386.

The results of Comparative Examples I–XXII by the prior art method show the effects of various parameters on the concentration of acid produced and the current efficiency. It should be particularly noted that lower current density decreases the acid concentration produced and the current efficiency as shown in Comparative Examples III and IX. It should also be noted that the membrane pair ASV/CL25T is much inferior to ASV/C322 in terms of the acid concentration produced as shown in Comparative Examples VIII and XV. The results of Examples I to XXII obtained by the method of this invention demonstrate that operation in accordance with the method of this invention results in higher acid concentrations being transported and improved current efficiency. Note particularly the results of Example VI by the method of this invention as compared to Comparative Example XV performed under similar conditions by the method of the prior art. Also note, for example, by comparison of Example XIV and Comparative Example III that operation by the method of this invention at lower current density with the inferior membrane pair ASV/CL25T results in performance comparable to the performance of the superior membrane pair ASV/C322 at higher current density.

Thus, It is quite obvious from the total acids concentration of the contents of the concentrate compartment that the process of this invention can be used very effectively to break the HF/H$_2$SiF$_6$/H$_2$O azeotrope, and recover anhydrous HF. By employing the preferred embodiments of the process of this invention, it is possible to obtain up to 50 weight percent total acids concentrations using electrodialysis cells at economical current densities of about 182 mA/cm$^2$ or less. As has been shown in the specific examples hereinabove, the total acid concentrations provided by the processes of this invention are higher than those obtained by the process of the prior art at higher and less economical current densities of about 273 mA/cm$^2$ or more. Thus, the process of this invention provides increased current efficiencies which reduces both membrane and power requirements.

Certain representative embodiments of the present invention have been presented for the purpose of particularly illustrating the invention. It will be apparent for those of skill in the art that various changes and modifications may be made herein without departing from the scope and spirit of the invention.

What is claimed is:

1. A process for recovering anhydrous hydrogen fluoride from a dilute solution comprising hydrogen fluoride, fluosilicic acid and water, wherein the percentage composition of said solution is such that anhydrous hydrogen fluoride cannot be recovered therefrom by distillation, said process comprising the steps of:
(a) introducing said dilute solution into a dilute compartment of at least one unit cell of an electrodialysis assembly comprising one or more unit cells positioned between an anolyte compartment containing an anode immersed in an anolyte, and a catholyte compartment containing a cathode immersed in a catholyte, each of said unit cells comprising a concentrate compartment and a dilute compartment separated by an anion permeable membrane, and each bounded by a face of a cation permeable membrane;
(b) introducing into said concentrate compartment an aqueous solution of hydrogen fluoride and fluosilicic acid wherein the concentration of fluosilicic acid in said solution is greater than about 5 weight percent, and wherein the total acids concentration in said solution is such that hydrogen fluoride cannot be obtained therefrom by distillation;

(c) passing direct current through said electrodialysis assembly for a time sufficient to increase the concentration of hydrogen fluoride in said concentrate compartment forming a product solution in which the total acids concentration is such that anhydrous hydrogen fluoride can be recovered therefrom by distillation;

(d) withdrawing said product solution from said concentrate compartment; and (e) recovering anhydrous hydrogen fluoride from said solution of step (d) by distillation.

2. A process according to claim 1 wherein the weight percent of fluosilicic acid in said dilute solution is less than about 36 weight percent.

3. A process according to claim 2 wherein the weight percent of hydrogen fluoride in said dilute solution is greater than about 5 weight percent based on the total weight of the solution.

4. A process according to claim 2 wherein the weight percent of hydrogen fluoride in said dilute solution is in the range of from about 5 to about 36 weight percent.

5. A process according to claim 1 wherein the hydrogen fluoride concentration in said solution of step b is less than the concentration of hydrogen fluoride in said dilute solution of step (a).

6. A process according to claim 4 wherein the concentration of hydrogen fluoride in said solution introduced into said concentrate compartment is in the range of from about 5 to about 30 weight percent, based on the total weight of the solution.

7. A process according to claim 6 wherein the concentration of hydrogen fluoride in said solution introduced into said concentrate compartment is from about 10 to about 30 weight percent, and the concentration of fluosilicic acid in said solution is from about 10 to about 36 weight percent.

8. A process according to claim 1 wherein the concentration of fluosilicic acid in said solution introduced into said concentrate compartment is in the range of from about 15 to about 36 weight percent, based on the total weight of the solution.

9. A process according to claim 1 wherein the concentration of hydrogen fluoride in said product solution is less than about 38 weight percent.

10. A process according to claim 8 wherein the concentration of hydrogen fluoride in said product solution is in the range of from about 10 to about 36 weight percent.

11. A process according to claim 8 wherein said concentration of hydrogen fluoride in said solution is from about 10 to about 15 weight percent and the total acids concentration is less than about 46 weight percent.

12. A process according to claim 11 wherein the concentration of hydrogen fluoride in said solution is about 10 weight percent, and the concentration of fluosilicic acid in said solution is about 36 weight percent, and the remainder of said solution is water.

13. A process according to claim 1 which further comprises introducing the fluosilicic acid rich bottoms of step (e), into the concentrate compartment of said unit cell.

14. In an improved process for converting aqueous fluosilicic acid to anhydrous hydrogen fluoride and finely divided silica of the type wherein aqueous fluosilicic acid is pyrolyzed forming a mixture of finely divided silica and gaseous hydrogen fluoride, water and $SiF_4$, and thereafter separating said silica from said mixture and forming an aqueous solution of hydrogen fluoride and fluosilicic acid, said improvement comprising recovering anhydrous hydrogen fluoride from said solution in accordance with the process of claim 1.

15. In an improved process of the type wherein aqueous fluosilicic acid is pyrolyzed forming finely divided silica and a dilute aqueous solution of hydrogen fluoride and fluosilicic acid, said improvement comprising:

vaporizing said solution to form a gaseous mixture of hydrogen fluoride, silicon tetrafluoride and water;

contacting said vaporized mixture with ordinary silica to convert all or part of the hydrogen fluoride to silicon tetrafluoride;

pyrolyzing said contacted mixture to form a mixture of finely divided silica and gaseous water, hydrogen fluoride and $SiF_4$, cooling said pyrolyzed mixture forming a mixture of finely divided silica and an aqueous solution of hydrogen fluoride and fluosilicic acid;

separating finely divided silica from said aqueous solution and recovering anhydrous hydrogen fluoride from said solution in accordance with claim 1.

* * * * *